United States Patent [19]

Kamola

[11] Patent Number: 5,848,334
[45] Date of Patent: Dec. 8, 1998

[54] DRIVE COUPLING WITH PLURAL INTIMATE PLANAR CONTACT

[75] Inventor: Roman C. Kamola, Naples, N.Y.

[73] Assignee: Xerox Corporation, Stamford, Conn.

[21] Appl. No.: 751,564

[22] Filed: Nov. 18, 1996

[51] Int. Cl.[6] .............................. G03G 15/00; F16D 1/12; F16D 3/00
[52] U.S. Cl. .......................... 399/167; 403/359; 464/160; 464/179; 464/182
[58] Field of Search ..................................... 399/167, 117, 399/110, 159; 403/359, 116; 439/21; 464/160, 179, 182, 185

[56] References Cited

U.S. PATENT DOCUMENTS

| | | | |
|---|---|---|---|
| 1,502,643 | 7/1924 | Leake | 464/160 |
| 3,942,887 | 3/1976 | McCarroll | 355/3 R |
| 4,327,992 | 5/1982 | Babicz | 355/3 R |
| 4,437,782 | 3/1984 | Geisthoff | 403/13 |
| 4,790,793 | 12/1988 | Bacardit | 464/160 |
| 4,859,110 | 8/1989 | Dommel | 403/325 |
| 5,149,223 | 9/1992 | Watts | 403/359 |
| 5,210,574 | 5/1993 | Kita | 355/211 |
| 5,390,602 | 2/1995 | Görl | 101/425 |
| 5,436,699 | 7/1995 | Komaki | 355/211 |
| 5,647,683 | 7/1997 | Easley | 403/359 |

Primary Examiner—Arthur T. Grimley
Assistant Examiner—Quana Grainger
Attorney, Agent, or Firm—John S. Wagley

[57] ABSTRACT

A drive mechanism including a first member and a second member is provided. The first member defines a first member axis of rotation. The first member has a first member surface. The second member defines a second member axis of rotation. The second member has a second member surface. The first member surface of the first member is in intimate contact at a contact zone with the second member surface of the second member. The contact zone defines a plane extending substantially through the first member axis and the second member axis, whereby the force transmitted by the drive mechanism is substantially tangential to the axes of said members.

7 Claims, 5 Drawing Sheets

FIG. 2
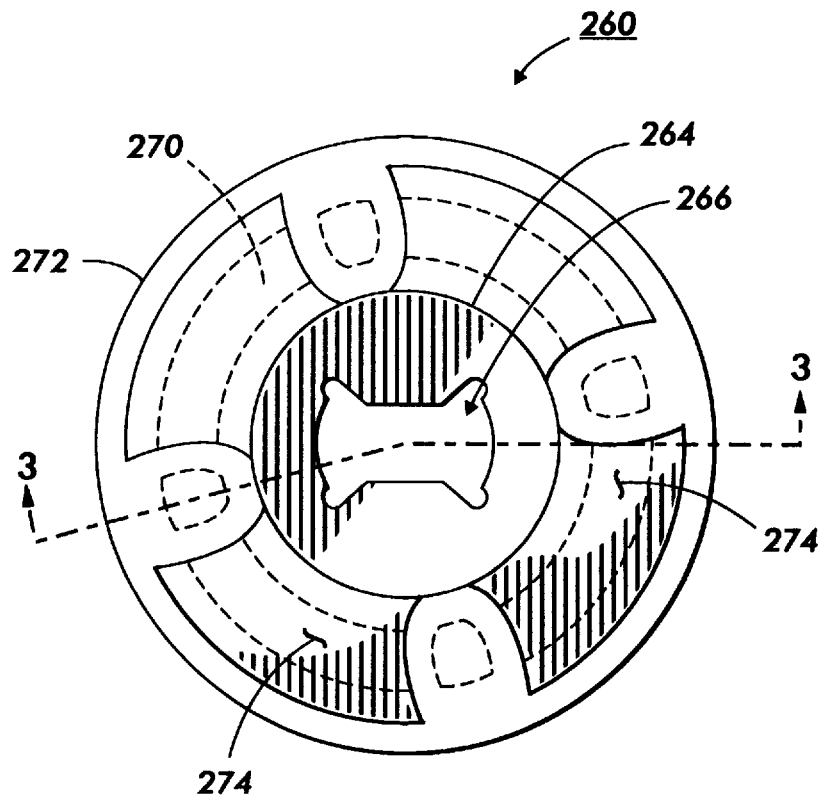
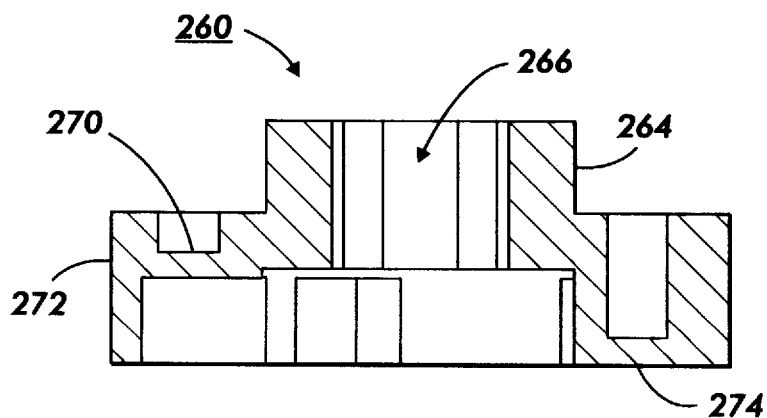
FIG. 3

DRIVE COUPLING WITH PLURAL INTIMATE PLANAR CONTACT

This invention relates to electrostatographic printing machines, and, more particularly, to an electrostatographic printing system having driven rotating elements.

Generally, the process of electrostatographic reproduction is executed by exposing a light image of an original document to a substantially uniform charged photoreceptive member. Exposing the charged photoreceptive member to a light image discharges the photoconductive surface thereof in areas corresponding to non-image areas in the original document while maintaining the charge on the image areas to create an electrostatic latent image of the original document on the photoconductive surface of the photoreceptive member. The latent image is subsequently developed into a visible image by depositing a charged developing material onto the photoconductive surface so that the developing material is attracted to the charged image areas thereon. The developing material is then transferred from the photoreceptive member to an output copy sheet on which the image may be permanently affixed in order to provide a reproduction of the original document. In a final step in the process, the photoreceptive member is cleaned to remove any residual developing material on the photoconductive surface thereof in preparation for successive imaging cycles.

The electrostatographic copying process described above is well known and is commonly used for light lens copying of an original document. Analogous processes also exist in other electrostatographic printing applications such as, for example, ionographic printing and reproduction, where charge is deposited on a charge retentive surface in response to electronically generated or stored images.

Machines including copy machines and printers typically include a multitude of interconnections of mechanical components. In particular, many rotating elements need to be mechanically connected to each other about a common drive axis. The need for such drive connections or couplings is particularly acute for copy machines. Copy machines typically have numerous rollers which guide and direct the original document and copy substrate through the copy machine. Many of these rolls are drive rolls which pull the copy substrates and the documents through the copy machine. Further, the development apparatus which moves the marking particles toward the latent image on the copy substrate requires a number of rolls and augers to move the toner toward the copy substrate. Further, the use of photoconductive belts requires several rollers to support and rotate the photoconductive belt. To provide for servicing of the photoconductive belt, the developing unit, and portions of the paper path, typically the copy machine includes modules which are slidably extendible from the frame of the machine to accommodate servicing and clearing of jams from the machine. When these slidable modules are returned to the operating position, typically spring-loaded drives are used to provide for reengagement of the drives. These drives then are re-engaged upon the rotation of the drive side.

Prior art of the drive connections include a spline, a round shaft having a flat thereon, or a round shaft with a drive key which engage mating configurations on mating parts. Other configurations of drive couplings include a shaft having an external square driver which mates with a shaft having a square bore. Similar to the square drive, triangular, pentagon and other geometric shapes may be used.

Alternatively, the mating parts to be coupled may be interferencely fitted or permanently affixed through gluing, welding, or soldering to provide for the drive. Permanent affixing of the two (2) drive components creates a particular problem where, as with the pull-out, spring-loading couplings previously mentioned, a great deal of wear on the components occurs. These drive coupling components need to be replaced on their mating shafts. The permanent affixion of these couplings may necessitate that large, complex shaft assemblies be replaced.

Prior art drive couplings such as splines flats and keys are very expensive to produce. Particularly complex drive components such as splines are hard to align to each other and have areas of high stress due to inherent imperfections in their complex shapes.

Drive components, particularly those having flats, notches, and tangs, wear quickly and may be inherently weak. Drives with geometric shapes, such as triangular and square drives, also wear quickly and are inherently weak.

The present invention is intended to overcome at least a portion of these problems.

The following disclosures appear to be relevant:

U.S. Pat. No. 5,436,699

Patentee: Komaki

Issued: Jul. 25, 1995

U.S. Pat. No. 5,390,602

Patentee: Gorl

Issued: Feb. 21, 1995

U.S. Pat. No. 5,210,574

Patentee: Kita

Issued: May 11, 1993

U.S. Pat. No. 5,149,223

Patentee: Watts

Issued: Sep. 22, 1992

U.S. Pat. No. 4,859,110

Patentee: Dommel

Issued: Aug. 22, 1989

U.S. Pat. No. 4,437,782

Patentee: Geisthoff

Issued: Mar. 20, 1984

U.S. Pat. No. 4,327.992

Patentee: Babicz

Issued: May 4, 1982

U.S. Pat. No. 3,942,887

Patentee: McCarroll

Issued: Mar. 9, 1976

The relevant portions of the foregoing disclosures may be briefly summarized as follows:

U.S. Pat. No. 5,436,699 discloses a photosensitive drum including an engaging clutch. The clutch includes a drive side clutch member and a drum side clutch member. The drum side clutch member may include a flange portion made of an insulating material which is mounted on an inner periphery of the conductive image carrier and an engaging portion made of a conductive material which is electrically and mechanically connectable to a claw of the drive side clutch member. A supporting pin made of metal may be used to align the drum side clutch member and the drive side clutch member.

U.S. Pat. No. 5,390,602 discloses a cleaning unit for a printing machine. The cleaning unit includes a washcloth located on a supply reel. The used washcloth is transported to a take up reel. A coupling couples the take up reel with a drive. A four corned shaft on a drive shaft connects a drive to a coupling located on the supply reel.

U.S. Pat. No. 5,210,574 discloses an image forming machine which includes a photosensitive drum on which a toner image is formed. The drum includes a pair of flange members and a drum body mounted to the flange members. A drive coupling made of a resilient metal is secured to one of the flange members an has a coupling protrusion that bites into the inner surface of the drum body.

U.S. Pat. No. 5,149,223 discloses a replaceable xerographic cassette which is coupled to a rotatable table driving shaft in a copy machine. A splined drive shaft of the cassette engages as the cassette is inserted into the machine. To accommodate angular misalignment of the shafts, the coupling member is of two part form and the two parts rotate relative to one another as the shaft is being inserted.

U.S. Pat. No. 4,859,110 discloses an automatic coupling device for connecting a splined shaft to a correspondingly internally splined yoke. A collar with flexible tabs is manually rotatable to an unlocked position and triggered to rotate to a locked position by locking balls. A torsion spring in the collar produces a the rotation of the coupling device.

U.S. Pat. No. 4,437,782 discloses a splined hub assembly for connecting two shafts which facilitates angular alignment of the splines relative to one another. The assembly has an opening formed in the wall of one of the members in which a ball is loosely held. The axial distance between the identical of greater than the axial length of the cylindrical ball contacting surface. Such a configuration allows for rotation of one of the splined members to facilitate alignment.

U.S. Pat. No. 4,327,992 discloses a copy machine having a drum and associated rollers. The drum and rollers are mounted in a pull out drawer. First and second one way clutches of the axially separable type are interposed in the gear trains and axially oriented between the frames for completing the drive connections when the drawer is closed in the operating position.

U.S. Pat. No. 3,942,887 discloses a drive mechanism of a roll fuser in a copy machine which includes an input coupling drive means for rotating the fuser roll and for rotating a back up roll while the two rolls are disengaged. The coupling member has a slot in the circular face thereof similar to a slot in the face of an end cap. An interposer member replaces the shaft and drivingly couples the end cap to the coupling member.

In accordance with one aspect of the invention, there is provided a drive mechanism including a first member and a second member. The first member defines a first member axis of rotation. The first member has a first member surface. The second member defines a second member axis of rotation. The second member has a second member surface. The first member surface of the first member is in intimate contact at a contact zone with the second member surface of the second member. The contact zone defines a plane extending substantially through the first member axis and the second member axis, whereby the force transmitted by the drive mechanism is substantially tangential to the axes of the members.

In accordance with another aspect of the present invention, there is provided a drive mechanism including an elongated first member having a substantially uniform cross section. The first member has a central portion and opposed first and second protrusions extending from the central portion The drive mechanism also includes a second member having a body defining an aperture. The aperture has a central portion spaced form the central portion of the first member and opposed first and second end portions. The first and second protrusions of the first member are matingly fitted to the first and second end portions, respectively, of the second member.

In accordance with yet another aspect of the present invention, there is provided a printing apparatus including a processing section for transferring a developed image onto a copy sheet and a drive mechanism for transmitting torque. The drive mechanism includes an elongated first member having a substantially uniform cross section. The first member has a central portion and opposed first and second protrusions extending from the central portion The drive mechanism also includes a second member having a body defining an aperture. The aperture has a central portion spaced form the central portion of the first member and opposed first and second end portions. The first and second protrusions of the first member are matingly fitted to the first and second end portions, respectively, of the second member, whereby the force transmitted by the drive mechanism is substantially tangential to the axes of the members.

For a general understanding of the present invention, as well as other aspects thereof, reference is made to the following description and drawings, in which like reference numerals are used to refer to like elements, and wherein:

FIG. 2 is a plan view of a first coupling member incorporating the drive coupling of FIG. 1, the coupling member having an aperture therethough, the aperture cooperating with the shaft of FIG. 1 to form the tangential force transmitting drive mechanism of the present invention;

FIG. 3 is a sectional view of the FIG. 2 first coupling member along the line 3—3 in the direction of the arrows;

While the present invention will be described with a reference to preferred embodiments thereof, it will be understood that the invention is not to be limited to these preferred embodiments. On the contrary, it is intended that the present invention cover all alternatives, modifications, and equivalents as may be included within the spirit and scope of the invention as defined by the appended claims. Other aspects and features of the present invention will become apparent as the description proceeds.

Figure 6:
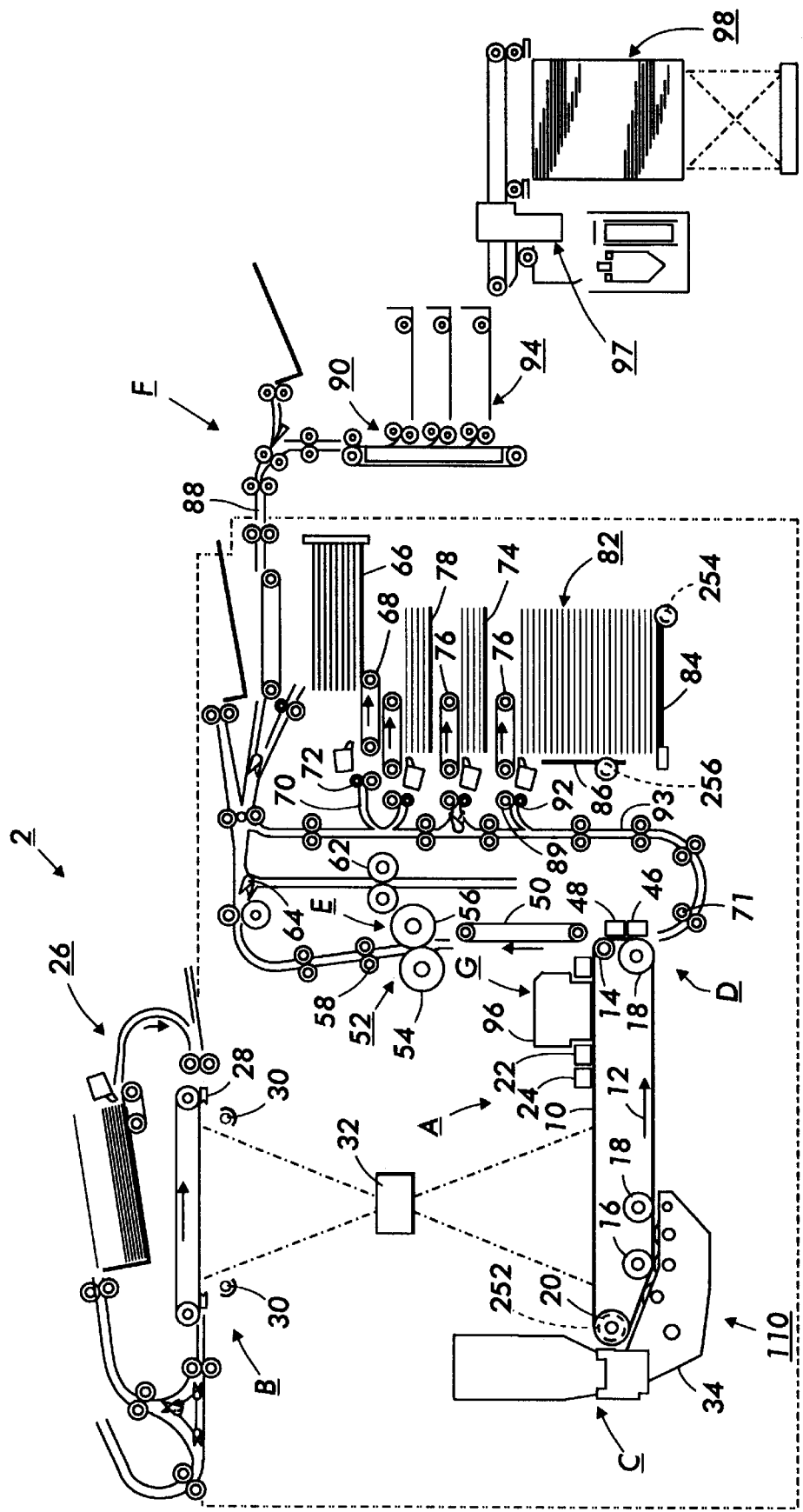
FIG. 6 is a schematic elevational view of a printing machine incorporating the tangential force transmitting drive mechanism according to the present invention.

Inasmuch as the art of electrostatographic processing is well known, the various processing stations employed in a typical electrostatographic copying or printing machine of the present invention will initially be described briefly with reference to FIG. 6. It will become apparent from the following discussion that the paper feeding system of the present invention is equally well suited for use in a wide variety of other electrophotographic or electronic printing systems, as for example, ink jet, ionographic, laser based exposure systems, etc.

Turning initially to FIG. 6, prior to discussing the invention in detail, a schematic depiction of an exemplary electrophotographic reproducing machine 2 incorporating various subsystems is furnished wherein a photoconductive belt 10 is employed, preferably comprising a photoconductive material coated on a ground layer, which, in turn, is coated on an anti-curl substrate. The photoconductive material typically includes a transport layer, which may contain molecules of di-m-tolydiphenylbiphenyldiamine dispersed in a polycarbonate, coated on a generator layer, generally made from trigonal selenium. The grounding layer is typically made from a titanium coated Mylar (a trademark of E.I. duPont de Nemours and Company (UK) Ltd.)(a polyester film). Of course, other suitable photoconductive materials, ground layers, and anti-curl substrates may also be employed.

Belt 10 is entrained about stripping roller 14, tensioning roller 16, rollers 18, and drive roller 20. Stripping roller 14 and rollers 18 are mounted rotatably so as to rotate with belt 10. Tensioning roller 16 is resiliently urged against belt 10 to maintain belt 10 under a desired tension. Drive roller 20 is rotated by a motor (not shown) coupled thereto by any suitable means such as a drive belt. Thus, the rotational movement of roller 20 advances belt 10 in the direction of arrow 12 to advance successive portions of the photoconductive surface sequentially through the various processing stations disposed about the path of movement thereof.

Initially, a portion of photoconductive belt 10 passes through charging station A whereat two corona generating devices, indicated generally by reference numerals 22 and 24, charge photoconductive belt 10 to a relatively high, substantially uniform potential. This dual or "split" charging system is designed so that corona generating device 22 places all of the required charge on photoconductive belt 10 while corona generating device 24 acts as a leveling device to provide a uniform charge across the surface of the belt. Corona generating device 24 also fills in any areas which may have been missed by corona generating device 22.

Next, the charged portion of photoconductive belt 10 is advanced through imaging station B, whereat an original document to be reproduced is placed on platen 28 for being imaged onto the charged photoconductive belt 10. Imaging of the document is achieved by two flash lamps 30 mounted in the optics cavity for illuminating the document on platen 28. Light rays are reflected from the document and transmitted through lens 32 which focuses the light image of the original document onto the charged portion of the photoconductive surface of belt 10 to selectively dissipate the charge thereon. This records an electrostatic latent image on photoconductive belt 10 corresponding to the informational areas contained within the original document.

It is noted that, at imaging station B, a document handling unit, indicated generally by reference numeral 26, may be positioned over platen 28 of the printing machine. The document handling unit 26 sequentially feeds documents from a stack of documents placed in a document stacking and holding tray such that the original documents to be copied are loaded face up into the document tray on top of the document handling unit. Using this system, a document feeder, located below the tray, feeds the bottom document in the stack to a pair of rollers for advancing the document onto platen 28 by means of a belt transport which is lowered onto the platen with the original document being interposed between the platen and the belt transport. When the original document is properly positioned on platen 28, the document is imaged and the original document is returned to the document tray from platen 28 by either of two paths. If a simplex copy is being made or if this is the first pass of a duplex copy, the original document is returned to the document tray via a simplex path. Conversely, if this is the inversion pass of a duplex copy, then the original document is returned to the document tray through a duplex path.

At development station C, a magnetic brush developer housing, indicated generally by the reference numeral 34, is provided, having three developer rolls, indicated generally by the reference numerals 36, 38 and 40. A paddle wheel picks up developer material, generally comprising triboelectrically charged carrier granules and toner particles, in the developer housing 34 for delivering the developer material to the developer rolls. When the developer material reaches rolls 36 and 38, it is magnetically split between the rolls with approximately half of the developer material being delivered to each roll. Photoconductive belt 10 is situated adjacent rolls 36 and 38 for attracting toner particles from an extended development zone formed thereby. Developer roll 40 is a cleanup roll and magnetic roll 44 is a carrier granule removal device adapted to remove any carrier granules adhering to belt 10. Thus, rolls 36 and 38 advance developer material into contact with the electrostatic latent image, which may include the additional image information provided by the annotation system, whereby the latent image attracts toner particles from the carrier granules of the developer material to form a toner powder image on the photoconductive surface of belt 10.

After development, belt 10 then advances the toner powder image to transfer station D, where a sheet of support material or a copy sheet (not shown) is moved into contact with the toner powder image. A corona generating device 46 charges the copy sheet to a proper potential so that the sheet is electrostatically secured or "tacked" to belt 10. Corona generating device 46 also provides electrostatic fields for attracting the toner image from the photoreceptor belt 10 to the copy sheet. Thus, the transfer station operates to induce contact between the developed image on belt 10 and the sheet of support material for transfer of the toner image thereto.

A high capacity feeder, indicated generally by the reference numeral 82, is the primary source of copy sheets. High capacity feeder 82 includes a tray 84 supported on an elevator 86. The elevator is driven by a bidirectional motor to move the tray up or down. In the up position, the copy sheets are advanced from the tray to transfer station D. A vacuum feed belt 88 feeds successive uppermost sheets from the stack to a take away roll 89 and rolls 92. The take-away roll 89 and rolls 92 guide the sheet onto transport 93. Transport 93 and roll 95 advance the sheet to rolls 71 which, in turn, move the sheet into the transfer zone at transfer station D.

After the developed image is transferred to the copy sheet, a second corona generator 48 charges the copy sheet to a polarity opposite that provided by corona generator 46 for electrostatically separating or "detacking" the copy sheet from belt 10. Thereafter, the inherent beam strength of the copy sheet causes the sheet to separate from belt 10 onto conveyor 50, positioned to receive the copy sheet for transporting the copy sheet to fusing station E.

Fusing station E includes a fuser assembly, indicated generally by the reference numeral 52, for permanently affixing the transferred toner powder image to the copy sheet. Preferably, fuser assembly 52 includes a heated fuser roller 54 and a pressure roller 56. The developed copy sheet is transported to the fusing station with the powder image on the copy sheet contacting fuser roller 54. The pressure roller 56 abuts the fuser roller 54 to provide the necessary pressure to fix the toner powder image to the copy sheet. In this exemplary fuser assembly, the fuser roll 54 is internally heated by a quartz lamp while a release agent, stored in a reservoir, is pumped to a metering roll which eventually applies the release agent to the fuser roll.

After fusing, the copy sheets are fed through a decurling apparatus 58 which bends the copy sheet in one direction to put a known curl in the copy sheet, thereafter bending the copy sheet in the opposite direction to remove that curl as well as any other curls or wrinkles which may have been introduced into the copy sheet. The copy sheet is then advanced, via forwarding roller pairs 60 to duplex turn roll 62. A duplex solenoid gate 64 selectively guides the copy sheet to finishing station F or to duplex tray 66. In the finishing station, the copy sheets are collected in sets and the copy sheets of each set can be stapled or glued together.

Alternatively, a solenoid activated gate 64 can be used to divert the sheet into duplex tray 66, providing intermediate storage for those sheets that have been printed on one side and on which an image will be subsequently printed on the second, opposed side thereof, i.e. the sheets being duplexed. Duplex sheets are typically stacked in duplex tray 66 face down in a configuration, one on top of another, in the order in which they are copied. In order to complete duplex copying, the simplex sheets in tray 66 are fed, in seriatim, by a bottom feeder 68, from tray 66 back to transfer station D, via conveyor 70 and rollers 72. These sheets are then transported back to the transfer station for transfer of a toner powder image to the opposite sides of the copy sheets. Inasmuch as successive bottom sheets are fed from duplex tray 66, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets may also be fed to transfer station D from a secondary tray 74 or an auxiliary tray 78 for providing additional sheet capacity on special types of copy sheets. Each tray includes an elevator driven by a bidirectional AC motor and a controller having the ability to drive the tray up or down. When the tray is in the down position, stacks of copy sheets are loaded thereon or unloaded therefrom. In the up position, successive copy sheets may be dispersed therefrom by a sheet feeder 76. Sheet feeder 76 may comprise a friction retard feeder, as shown schematically in FIG. 3, utilizing a feed belt and take-away rolls to advance successive copy sheets to transport 70 which, in turn, advances the sheets to rolls 72 and then to transfer station D. It will be recognized that secondary tray 74 and auxiliary tray 78 are supplemental sources of copy sheets for providing machine adaptability and flexibility for particular print jobs.

Invariably, after the copy sheet is separated from photoconductive belt 10, some residual particles remain bonded thereto. Thus, after transfer, photoconductive belt 10 passes beneath corona generating device 48 which charges the residual toner particles to the proper polarity for breaking the bond between the toner particles and the belt. Thereafter, a precharge erase lamp (not shown), located inside the loop formed by photoconductive belt 10, discharges the photoconductive belt in preparation for the next charging cycle. Residual particles are removed from the photoconductive surface at cleaning station G which may include an electrically biased cleaner brush 96 and waste and reclaim de-toning rolls (not shown). The reclaim roll may be electrically biased to a polarity opposite that of the cleaner roll 96 so as to remove toner particles therefrom while the waste roll may also be electrically biased positively relative to the reclaim roll so as to remove paper debris and wrong sign toner particles. The toner particles on the reclaim roll are scraped off and deposited in a reclaim auger (not shown), where they are transported out of the rear of cleaning station G.

Output path 88 is directly connected in a conventional manner to a bin sorter 90 as is generally known and as is disclosed in commonly assigned U.S. Pat. No. 3,467,371 incorporated in its entirety by reference herein. Bin sorter 90 includes a vertical bin array 94 which is conventionally gated (not shown) to deflect a selected sheet into a selected bin as the sheet is transported past the bin entrance. An optional gated overflow top stacking or purge tray may also be provided for each bin set. The vertical bin array 94 may also be bypassed by actuation of a gate for directing sheets serially onward to a subsequent finishing station. The resulting sets of prints are then discharged to finisher 97 which may include a stitcher mechanism for stapling print sets together and/or a thermal binder system for adhesively binding the print sets into books. A stacker 98 is also provided for receiving and delivering final print sets to an operator or to an external third party device.

The foregoing description should be sufficient for the purposes of the present disclosure for patent to illustrate the general operation of an electrophotographic reproducing apparatus incorporating the features of the present invention. As previously discussed, the electrophotographic reproducing apparatus may take the form of any of several well known devices or systems such that variations of specific electrostatographic processing subsystems or processes may be expected without affecting the operation of the present invention.

The printing machine 2, as shown in FIG. 6, includes many rotating mechanisms. The drive coupling of the present invention is applicable to any rotating mechanism where two (2) adjoining components rotate about a common axis.

Several of these mechanisms are included in subassemblies or units that, to clear paper jams and for ease of servicing, are suspended on slides which move outside the frame of the machine. For example, referring to FIG. 6, developer unit 110 includes a developer unit slide 240 to permit the developer unit to be serviced and to provide access for clearance of paper jams. Drives associated with the developer unit 110 thus need to be engaged and disengaged as the developer unit 110 is slid from the operating position to the extended position along the developer unit slide 240. Drive couplings (not shown) are located at the mixing auger drive 242 and at the developer rolls drive 244. Similarly, the photoreceptor module 246 is located on photoreceptive belt slide 250. Photoreceptor drive 252 likewise utilized a separable coupling. Further, the high-speed capacity sheet feeder 82 includes a slide 254 which requires a high-speed capacity feeder drive 256 to engage elevator 86.

The engaging and disengaging of the separable drive couplings for the photoreceptor drive 252, the mixing auger drive 242, and the developer roller drive 244, as well as the feeder drive 256, are subject to additional torque when engaging and disengaging the units. The drive coupling of the present invention is particularly well suited for those applications with separable drive couplings.

Figure 4:
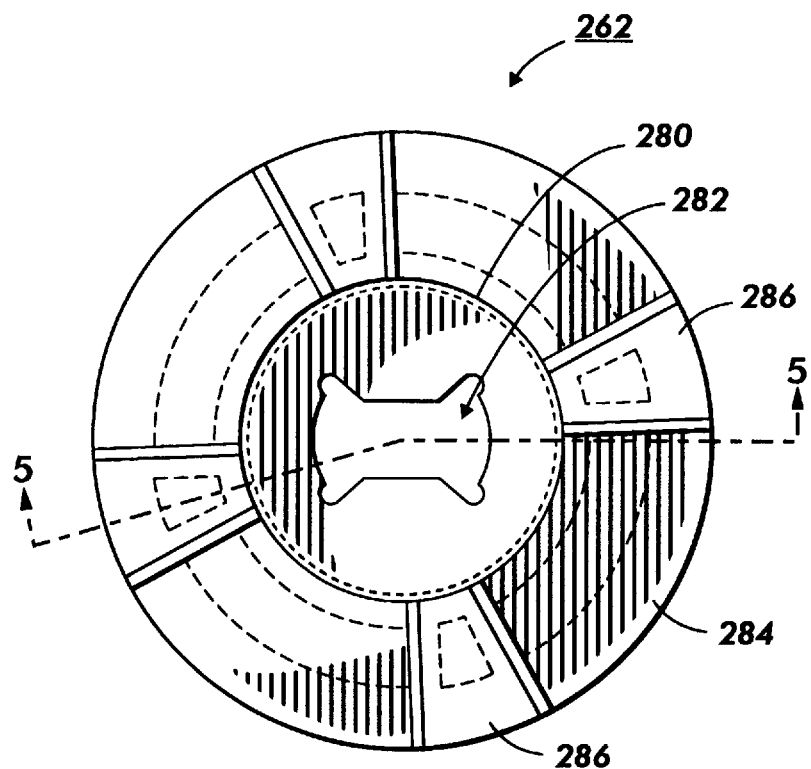
FIG. 4 is a plan view of a second coupling member incorporating the drive coupling of FIG. 1, the coupling member having an aperture therethough, the aperture cooperating with the shaft of FIG. 1 to form the tangential force transmitting drive mechanism of the present invention.
Figure 5:
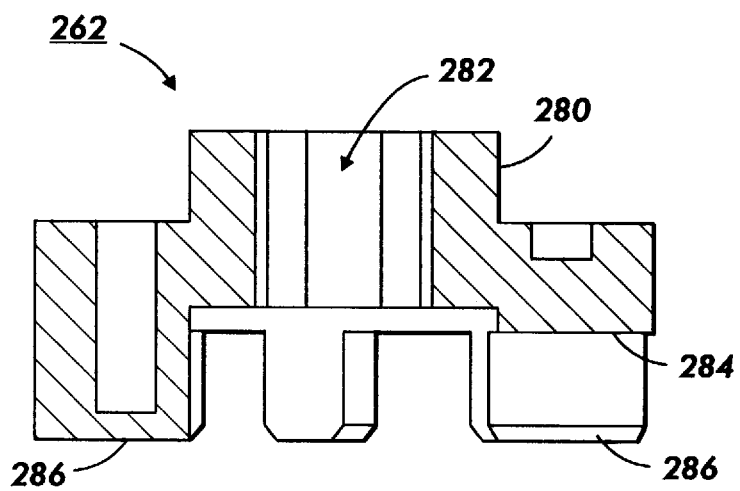
FIG. 5 is a sectional view of the FIG. 4 second coupling member along the line 5—5 in the direction of the arrows.

Referring now to FIGS. 2–5, a first separable coupling member 260 is shown in FIGS. 2 and 3, and a second separable coupling member 262 is shown in FIGS. 4 and 5.

Referring now to FIGS. 2 and 3, first coupling member 260 may be any suitable member which when interacting with a second coupling member 262 provide for the separable coupling of two (2) axially rotating members. For example, the coupling member 260 may be any commercially available member. The coupling member 260 preferably includes a centrally located hub 264 which includes a central feature 266 in the form of a aperture which mates with a shaft (not shown). The aperture 266 and the shaft form a drive coupling with a tangentially directed force vector according to the present invention.

Extending radially outwardly from hub 264 is a flange 270. Extending axially outward from the flange 270 is tube 272. Protrusions 274 extend inwardly from the tube 272. The protrusions 274 connect the first coupling member 260 to the second coupling member 262.

Referring now to FIGS. 4 and 5, the second coupling member 262 includes hub 280. Hub 280, like hub 264 of the coupling member 260, includes an aperture 282. The aperture 282 is matingly fitted to a shaft (not shown). The aperture 282 and the shaft form a drive coupling with a tangentially directed force vector according to the present invention.

A flange 284 extends radially outward from the hub 280. Lugs 286 extend axially outward from the flange 284. The lugs 286 contact the protrusions 274 of the first coupling member 260 to translate torque from the first coupling member 260 to the second coupling member 262.

Figure 7:
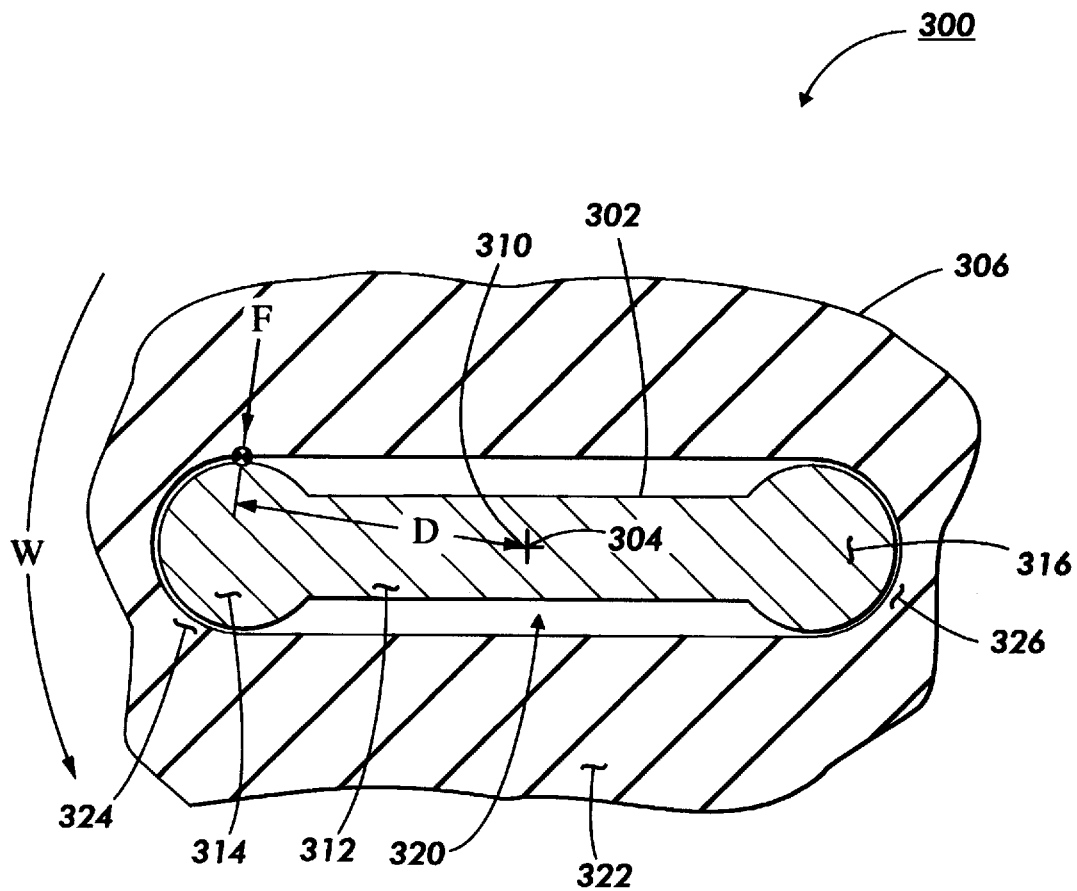
FIG. 7 is partial elevation view of an alternative embodiment of a drive coupling including a coupling member and a shaft in section incorporating the tangential force transmitting drive mechanism of the present invention.

Referring now to FIG. 7, a drive coupling with tangential force factor according to the present invention is shown in drive coupling 300. The drive coupling 300 includes a first member 302, having a first member axis of rotation 304, and a second member 306, having a second member axis of rotation 310 The axes of rotation 304 and 310 are coincident. The first member 302 and the second member 306 may be made of any suitable, durable material, for example, a metal or plastic. The members 302 and 306 may be made by any suitable manufacturing process, for example, by machining, molding, or casting. For example, the first member 302 may be a shaft and the second member 306 may be a gear, pulley, or other mechanical component.

The first member 302 includes a central portion 312. First end portion 314 and second end portion 316 extend outwardly from the central portion 312, preferably in opposed directions.

The second member 306 includes a centrally located aperture 320. The aperture 320 conforms generally to the shape of the first member 302. Preferably, the aperture 320 is centrally positioned about the second member axis of rotation 310. The aperture defines a central portion 322 thereof, as well as a first end portion 324 and a second end portion 326. The first end portion 324 and the second end portion 326 extend outwardly from the central portion 322. Preferably, the first end portion 324 and the second end portion 326 extend in opposed directions from the central portion 322.

When the first member 302 is inserted into the aperture 320 of the second member 306, the first end portion 314 and the second end portion 316 of the first member 302 are in general contact along the outer periphery thereof with first end portion 324 and second end portion 326 of the aperture 320 of the second member 306. Conversely, the central portion 312 of the first member 302 is spaced from the central portion 322 of the aperture 320 of the second member 306. The configuration of the drive coupling 300 provides for improved strength over prior art drive couplings in that the torque is transmitted from the first member 302 to the second member 306 at the extremities of the respective members. For example, as shown in FIG. 7, when the first member 302 is subjected to a torsional force W, a normal force F is exerted normal at distance D from center of rotation 310 of the second member. A relationship of these forces can be expressed by utilization of the simple formula:

$$W = F \times D,$$

where

W=rotational torque in foot pounds

F=force in pounds

D=distance in feet

It can easily been seen that, by the utilization of the drive coupling 300 of the present invention, greater rotational torque can be accomplished with smaller normal forces thereby reducing the stress on the driving mechanism.

Figure 1:
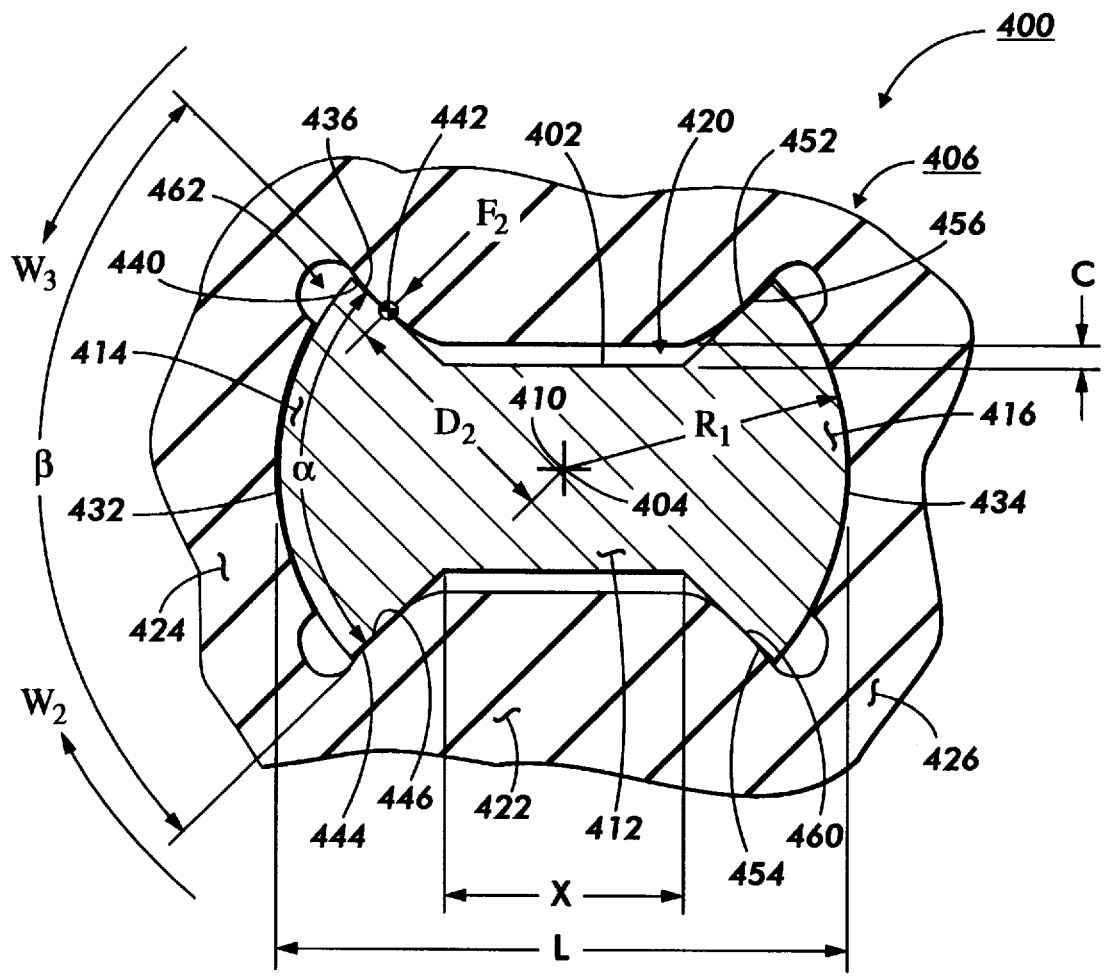
FIG. 1 is partial elevation view of a drive coupling including a coupling member and a shaft in section incorporating the tangential force transmitting drive mechanism of the present invention.

Another embodiment of the present invention is shown in drive coupling 400 of FIG. 1. Drive coupling 400 is similar to drive coupling 300 in that drive coupling 400 includes a first member 402 including a first member center line of rotation 404, and a second member 406 having a second member center of rotation 410. The first member 402 and the second member 406 may be made of any suitable, durable material. For example, the first member 402 and second member 406 may be made from a metal or from a plastic. Because of the increased inherent torque-carrying capacity of the drive coupling of the present invention, the drive coupling of the present invention is particularly well suited for lower strength materials, for example, plastics.

The first member 402 includes a central portion 412 and a first end portion 414 and a second end portion 416 extending from central portion 412. Preferably, the first end portion 414 and the second end portion 416 extend from the central portion 412 in opposed directions.

The second member 406 defines a central aperture 420 therein. The aperture 420 is preferably positioned about second member center line 410. The aperture 420 defines a central portion 422 and first and second end portions 424 and 426 extending outwardly from the central portion 422. Preferably, the first end portion 424 and the second end portion 426 extend outwardly in opposed directions. Preferably, the first end portion and second end portion 424 and 426, respectively, of the aperture 420 closely conform to outer periphery 430 of the first member 402.

Preferably, in order to obtain the improved torque-carrying capacity of the drive coupling of the present invention, the central portion 412 of the first member 402 is spaced from the central portion 422 of the aperture 420 of the second member 406. The central portion 412 of the first member is separated from the central portion 422 of the aperture 420 of the second member 406 by a distance called C. Typically, for a first member 402 having a length L of approximately 0.50 inches, the clearance C is approximately 0.05 inches.

To optimize the torque-transferring capacity of drive coupling 400, preferably, distal ends 432 and 434 of first end portion 414 and second portion 416, respectively, of the first member 402 have an arcuate shape. Preferably, ends 432 and 434 are defined by radius "R" having a center line coincident center line 404 of the first member 402.

When the first end portion 414 and the second end portion 416 include ends 432 and 434 defined by a radius "R," torque may not be efficiently transmitted along ends 432 and 434. Therefore, at least one of the first end portion 414 and the second end portion 416 preferably includes a surface for transmitting the torque from the first member 402 to the second member 406. For example, as shown in FIG. 1, the first end portion 414 includes a first member surface 436. Preferably, the first member surface 436 is a generally planar surface and extends inwardly from end 432 of the first end portion 414. To optimize transfer of torque from the first member 402 to the second member 406, preferably, the aperture 420 of the second member 406 defines a second member surface 440 which is generally parallel and adjacent to the first member surface 436 of the first member 402.

As stated earlier, when transmitting torque from a first member to a second member, forces transmitted generally normal or perpendicular to the contact surface between the two (2) members. Therefore, for transmitting torque $W_2$ between first member surface 436 and second member surface 440, the plane including surfaces 436 and 440 is preferably coincident with center lines 404 and 410 of the members 402 and 406, respectively. When the surfaces 436 and 440 are so aligned, the torque $W_2$, is equal to the force $F_2$ times the distance $D_2$ from the center line 402 to contact center point 442 between first member surface 436 and second member surface 440.

To transmit torque $W_3$ in the opposite direction of torque $W_2$ preferably, the first end portion 414 of the first member 402 preferably includes a second first member surface 444 which mates with second member surface 446 of the second member 406. Similar to surfaces 440 and 436, surfaces 444 and 446 are preferably planar, and similarly the plane including surfaces 444 and 446 is preferably coincident with center lines 404 and 410 of the first and second members 402 and 406, respectively.

Surfaces 436 and 444 of the first member 402 define angle α therebetween. Surfaces 440 and 446 of the second member 406 define angle β therebetween. Generally, angle α and angle β are substantially equal. Values of α and β may vary widely depending on the application of the drive coupling. Preferably, angles α and β vary from approximately 30 degrees to 150 degrees. Applicant has found that angles α and β of approximately 90 degrees perform efficiently.

Preferably, to provide for balanced force vectors between the first member 402 and the second member 406, preferably, the second end portion 416 is symmetrical with the first end portion 414. The second end portion 416, therefore, defines a third first member surface 452 and a fourth first member surface 454. Likewise, the second end portion 426 of aperture 420 is symmetrical with first end portion 424 of aperture 420. Second member 406, thus preferably, defines the third second member surface 456 and fourth second member surface 460. Preferably, surfaces 452 and 456 are planar and adjacent to each other and the plane including surfaces 452 and 456 is preferably coincident with center lines 404 and 410 of the members 402 and 406, respectively. Similarly, preferably, surfaces 454 and 460 are planar and adjacent to each other. The plane including surfaces 454 and 460 preferably is coincident with center lines 404 and 410. Surfaces 452 and 454 define an included angle which preferably is identical to angle α. Similarly, surfaces 456 and 460 define an included angle which preferably is identical to angle β.

It should be appreciated that the invention may be practiced with contact surfaces which are not coincident with the center line of the members. Further, the invention may be practiced where the end portions are not symmetrical about the central portion. Design perimeters of particular implementations may vary widely.

The central portion 412 of the first member 402 is defined by a length X which extends from first end portion 414 to second end portion 416. The length X relative to the overall length L of the first member 402 may vary widely. Applicant has found that a length X of approximately 50% of the overall length L of the first member is effective.

Preferably, the second member 406 includes relief 462 located at opposed ends of first end portion 424 and second end portion 426 of the aperture 420. The relief or clearance 462 serves to provide clearance for burrs or imperfections located at the extremities of the first and second member 402 and 406, respectively.

By providing a drive coupling having two (2) components with adjacent driving surfaces being generally planar and extending toward the center of the drive coupling, a drive coupling is provided which is inherently stronger and may utilize less expensive materials in smaller components.

By providing a drive coupling with planar contact surfaces which extend inwardly, a drive coupling is provided which maintains planar contact as adjacent components wear, thereby reducing wear.

By providing a drive coupling with planar drive contact surfaces therebetween, a coupling is provided which has less stress for similar torque-transmitting capabilities.

By providing a drive coupling with planar drive contact surfaces that increase as the result of deformation and as a result of wear, the stress of the drive coupling, which is a quotient of the force applied divided by the contact area, is reduced with wear and deformation of the coupling.

By providing a drive coupling with planar drive contact surfaces that increase as the result of deformation and as a result of wear, the wear of the coupling decreases after an initial break in period when the contact surfaces increase as the result of deformation and as a result of wear It is, therefore, evident that there has been provided, in accordance with the present invention, an electrostatographic copying apparatus that fully satisfies the aims and advantages of the invention as hereinabove set forth. While the invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. The drive mechanism comprising:
   a first member defining a first member axis of rotation thereof, said first member including a central portion, a first end portion, extending from said central portion, said first end portion defining an arcuate periphery opposed to said central portion, said first end portion defining first and second first member surfaces extending from the arcuate periphery of said first end portion to said central portion and a second end portion, extending from said central portion, said second end portion defining an arcuate periphery opposed to said central portion, said second end portion defining third and fourth first member surfaces extending from the arcuate periphery of said second end portion to said central portion; and a second member defining a second member axis of rotation thereof, said second member including a plurality of second member surfaces, each of said first member surfaces of said first member being in intimate contact at contact zones with one of said second member surfaces of said second member, each of said contact zones defining a plane extending substantially through said first member axis of rotation and said second member axis of rotation, whereby the force transmitted by the drive mechanism is substantially tangential said first member axis of rotation and said second member axis of rotation.

2. The drive mechanism of claim 1 wherein said second member comprises a body, said body defining an aperture therein, said aperture having a second member central portion, a second member first end portion, extending from said second member central portion, said second member first end portion defining an arcuate periphery opposed to said second member central portion, said second member first end portion defining first and second member surfaces extending from the arcuate periphery of said second member first end portion to said second member central portion and a second member second end portion, extending from said second member central portion, said second member second end portion defining an arcuate periphery opposed to said second member central portion, said second member second end portion defining third and fourth second member surfaces extending from the arcuate periphery of said second member second end portion to said second member central portion.

3. A drive mechanism comprising:

an elongated first member having a substantially uniform cross section, said first member having a central portion and opposed first and second protrusions extending from said central portion, said first protrusion defines an arcuate periphery opposed to said central portion; and a second member having a body defining an aperture therein, the aperture having a central portion spaced from the central portion of said first member and opposed first and second end portions, said first and second protrusions of said first member being substantially in intimate contact with the first and second end portions, respectively, of said second member, said second protrusion defining an arcuate periphery opposed to said central portion of said first member.

4. A printing apparatus including a processing section for transferring a developed image onto a copy sheet and a drive mechanism for transmitting torque, said drive mechanism, comprising:

a first member defining a first member axis of rotation thereof, said first member including a central portion, a first end portion, extending from said central portion, said first end portion defining an arcuate periphery opposed to said central portion, said first end portion defining first and second first member surfaces extending from the arcuate periphery of said first end portion to said central portion, and a second end portion, extending from said central portion, said second end portion defining an arcuate periphery opposed to said central portion, said second end portion defining third and fourth first member surfaces extending from the arcuate periphery of said second end portion to said central portion; and a second member defining a second member axis of rotation thereof, said second member including a plurality of second member surfaces thereof, each of said first member surfaces of said first member being in intimate contact with and forming a substantially planar contact zone with one of said second member surfaces of said second member, each of the planar contact zones being coincident with a plane extending substantially through said first member axis of rotation and said second member axis of rotation, whereby the force transmitted by the drive mechanism is substantially tangential to said first member axis of rotation and said second member axis of rotation.

5. The printing apparatus of claim 4, wherein said second member comprises a body, said body defining a aperture therein, said aperture having a second member central portion, a second member first end portion, extending from said second member central portion, said second member first end portion defining a arcuate periphery opposed to said second member central portion, said second member first end portion defining first and second member surfaces extending from the arcuate periphery of said second member first end portion to said second member central portion and a second member second end portion, extending from said second member central portion, said second member second end portion defining a arcuate periphery opposed to said second member central portion, said second member second end portion defining third and fourth second member surfaces extending from the arcuate periphery of said second member second end portion to said second member central portion.

6. The drive mechanism comprising:

a first member defining a first member axis of rotation thereof, said first member including a central portion, a first end portion, extending from said central portion, said first end portion defining a periphery opposed to said central portion, said first end portion defining first and second first member surfaces extending from the periphery of said first end portion to said central portion and a second end portion, extending from said central portion, said second end portion defining a periphery opposed to said central portion, said second end portion defining third and fourth first member surfaces extending from the periphery of said second end portion to said central portion; and a second member defining a second member axis of rotation thereof, said second member including a plurality of second member surfaces, at least one of said first member surfaces of said first member being in intimate contact at contact zones with at least one of said second member surfaces of said second member, each of said contact zones defining a plane thereof, said planes substantially converging toward said first member axis of rotation and said second member axis of rotation.

7. A printing apparatus including a processing section for transferring a developed image onto a copy sheet and a drive mechanism for transmitting torque, said drive mechanism, comprising:

a first member defining a first member axis of rotation thereof, said first member including a central portion, a first end portion, extending from said central portion, said first end portion defining an arcuate periphery opposed to said central portion, said first end portion defining a plurality of first member surfaces extending from said central portion to the arcuate periphery of said first end portion; and a second member defining a second member axis of rotation thereof, said second member including a plurality of second member surfaces thereof, each of said first member surfaces of said first member being in intimate contact with and forming a substantially planar contact zone with one of said second member surfaces of said second member, each of the planar contact zones being coincident with a plane thereof, said planes converging substantially toward said first member axis of rotation and said second member axis of rotation.

* * * * *